United States Patent
Tivyan et al.

(10) Patent No.: US 8,577,343 B2
(45) Date of Patent: Nov. 5, 2013

(54) INHIBITING UNINTENDED OUTGOING COMMUNICATION IN MOBILE DEVICES

(75) Inventors: Roman Tivyan, San Diego, CA (US); Babak Forutanpour, Carlsbad, CA (US); Daniel S. Baker, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 63 days.

(21) Appl. No.: 13/252,709

(22) Filed: Oct. 4, 2011

(65) Prior Publication Data
US 2013/0084834 A1    Apr. 4, 2013

(51) Int. Cl.
*H04M 3/42*    (2006.01)

(52) U.S. Cl.
USPC ......... 455/414.1; 455/567; 455/406; 455/407

(58) Field of Classification Search
USPC ................... 455/414.1, 567, 406, 407
See application file for complete search history.

(56) References Cited

U.S. PATENT DOCUMENTS

| 6,442,406 | B1 | 8/2002 | Harris et al. |
| 6,542,729 | B1 | 4/2003 | Chmaytelli et al. |
| 6,662,026 | B1 | 12/2003 | Cordray et al. |
| 7,800,044 | B1 | 9/2010 | Kahn et al. |
| 2004/0125993 | A1 | 7/2004 | Zhao et al. |
| 2010/0317400 | A1 | 12/2010 | Bivens et al. |

FOREIGN PATENT DOCUMENTS

| CN | 101841786 | 9/2010 |
| EP | 1755322 A2 | 2/2007 |
| EP | 2323354 A1 | 5/2011 |
| GB | 2209906 A | 5/1989 |
| WO | WO9815139 A2 | 4/1998 |
| WO | WO0001031 A1 | 1/2000 |
| WO | WO2004093424 A1 | 10/2004 |

OTHER PUBLICATIONS

International Search Report and Written Opinion—PCT/US2011/054910—ISA/EPO—May 4, 2012 (102068WO).

*Primary Examiner* — David Q Nguyen
(74) *Attorney, Agent, or Firm* — Muncy, Geissler, Olds & Lowe, PLLC (57) ABSTRACT

An embodiment is a technique for inhibiting unintended outgoing communication. A cost calculator calculates a cost value of an outgoing communication as a function of a plurality of parameters related to at least one of a voice parameter, an ambient parameter, a proximity parameter, a speech pattern parameter, a call parameter, and a noise parameter. A call suppressor suppresses the outgoing communication when the cost value exceeds a predetermined threshold.

28 Claims, 7 Drawing Sheets

INHIBITING UNINTENDED OUTGOING COMMUNICATION IN MOBILE DEVICES

FIELD OF DISCLOSURE

The presently disclosed embodiments are directed to the field of mobile communication, and more specifically, to unintended mobile communication.

BACKGROUND

With the advances of microprocessor and communication technologies, mobile communication has played an important role in modern consumer market. Typical mobile devices may pack many advanced features such as high resolution graphics and imaging, voice processing, and intelligent user's interface in compact and low power handsets. One problem with modern mobile devices is the control of call initiation, such as unintended outgoing calls. For example, when a mobile handset is placed in a user's pocket, handbag, or purse, unintended or accidental call initiation may occur when the device input entry (e.g., keypad) is accidentally pressed due to pressure or movement. Such an unintended outgoing call may create several problems including incurring costs due to long running message left to voicemail of the recipient, compromising privacy or personal security.

Existing techniques to overcome the above problems have a number of drawbacks. One technique is to use a locking mechanism to lock the call functionality when the device is not in use. The locking mechanism may be a physical lock (e.g., a switch) or a soft key lock in which the user enters a keystroke or a sequence of keystrokes. This technique requires a conscious user action and may be inconvenient. In addition, if the device is Bluetooth-enabled, it may be activated even while being locked. Another technique monitors the outgoing and incoming voice levels to detect an absence of conversation in both directions and activates an alarm if an absence of such conversation is detected. This technique may not be fool-proof because the noise environment at the calling device, such as loud background music, may be such that the outgoing voice levels may be erroneously interpreted as an intended voice communication.

SUMMARY

Disclosed embodiments of the invention are directed to systems and method for inhibiting unintended outgoing communication in mobile devices.

One disclosed feature of the embodiments is a technique for inhibiting unintended outgoing communication. A cost calculator calculates a cost value of an outgoing communication as a function of a plurality of parameters related to at least one of a voice parameter, an ambient parameter, a proximity parameter, a speech pattern parameter, a call parameter, and a noise parameter. A call suppressor suppresses the outgoing communication when the cost value exceeds a predetermined threshold.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of embodiments of the invention will not be described in detail or will be omitted so as not to obscure the relevant details of the embodiments of the invention.

The term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

One disclosed feature of the embodiments is a technique for inhibiting unintended outgoing communication in mobile devices. A cost calculator calculates a cost value of an outgoing communication as a function of a plurality of parameters related to at least one of a voice parameter, an ambient parameter, a proximity parameter, a speech pattern parameter, a call parameter, and a noise parameter. A call suppressor suppresses the outgoing communication when the cost value exceeds a predetermined threshold.

One disclosed feature of the embodiments may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc. One embodiment may be described by a schematic drawing depicting a physical structure. It is understood that the schematic drawing illustrates the basic concept and may not be scaled or depict the structure in exact proportions.

One disclosed feature of the embodiments is a method and apparatus for inhibiting unintended mobile outgoing communication. It is noted that, while the description of the embodiments focuses on unintended outgoing communication in a mobile device, the techniques may be applicable in other appropriate environments and applications. The scenario of such environments or applications includes a device placed in an environment that is not the usual operational environment and an unintended or accidental action is operated on the device. By monitoring the environmental conditions and the particular characteristics of the action, the unintended action may be identified and suppressed.

Figure 1:
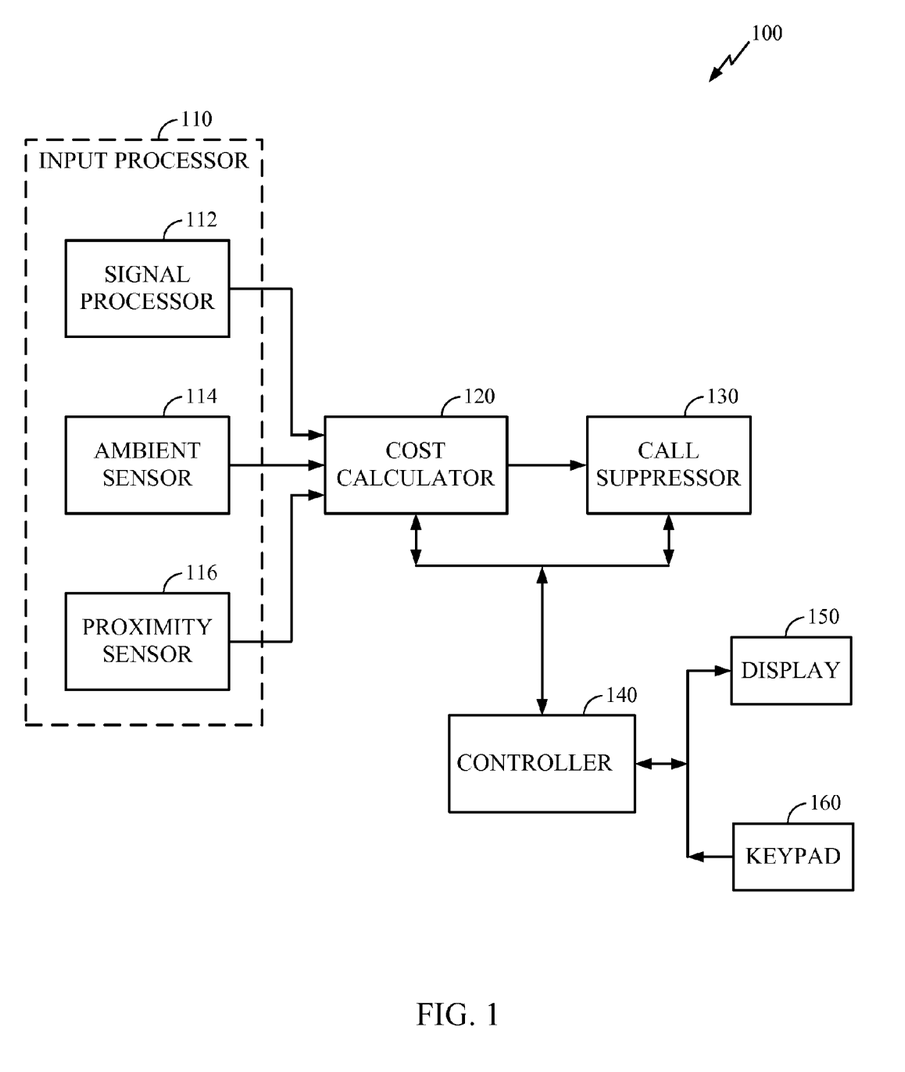
FIG. 1 is a diagram illustrating a system for inhibiting unintended outgoing communication in a mobile device according to one embodiment.

FIG. 1 is a diagram illustrating a system 100 for inhibiting unintended outgoing communication in a mobile device according to one embodiment. The system 100 includes an input processor 110, a cost calculator 120, a call suppressor 130, a controller 140, a display 150, and a keypad 160. The system 100 may include more or less than the above components. In addition, any of the above components may be implemented by hardware, software, firmware, or any combination of hardware, software, and firmware.

The input processor 110 processes the input information and/or data and provides the input values or signals or data to the cost calculator 120. The input processor 110 may include a signal processor 112, an ambient sensor 114, and a proximity sensor 116. Other sensors or processors may be included according to the particular environment in which the system or device 100 may operate. For example, a humidity sensor may be used to monitor or sense the humidity level, a heat sensor to monitor or sense the temperature, a pressure sensor to monitor or sense the pressure, etc. These sensors may be added or replace any of the sensors or devices above.

The signal processor 112 may perform signal processing functions on the input signal. The input signal may be the audio signal as provided by a microphone (not shown). The audio signal may represent the speech signal as spoken by the user of the system or mobile device 100. The signal processor 112 may employ the existing circuitry in the mobile device. Examples of components in the signal processor 112 may include some or all of a signal conditioning device, an analog amplifier, a low-pass filter, a frequency generator, a phase-locked loop (PLL) circuit, a timing and control circuit, a frequency-domain circuit or module (e.g., Fast Fourier Transform, or FFT, processor), and other communication circuits or devices. The signal conditioning device may condition the input signal in preparation for subsequent processing (e.g., noise cleaning) The analog amplifier amplifies the conditioned signal. The low-pass filter filters the amplified signal to eliminate high frequency components. The cut-off frequency of the low-pass filter may be compatible with human voice frequency typically used in a normal phone conversation. The human voice frequency may typically range from 60 Hz to 7000 Hz. However, this frequency range covers a wide variety of human-made sounds such as talking, singing, laughing, crying or screaming. For a normal human voice conversation, the frequency range may be much lower, ranging from 60 Hz to 500 Hz. The frequency generator, PLL circuit, timing and control circuit may be used to provide accurate timing information to support various communication protocols or standards used in mobile communication such as Global System for Mobile Communication (GSM), Time Division Multiple Access (TDMA), Code Division Multiple Access (CDMA), Universal Mobile Telecommunications System (UMTS), Orthogonal frequency-division multiple access (OFDM), Interim Standard 95 (IS-95), etc., used in first generation (1G), second generation (2G), third generation (3G), or future generations. The frequency-domain circuit processes the signal in the frequency domain. For example, the FFT processor computes the frequency components in the signal.

The ambient sensor 114 senses the ambient conditions such as light level, humidity, temperature, pressure, etc. The ambient conditions may indicate the nature of the surrounding environment. For example, when the mobile device is placed in a pocket, a purse, or a backpack, the ambient light level is very low. A light sensor therefore may be used to determine the ambient light level. In most modern mobile devices, an image sensor, such as a Complementary Metal Oxide Semiconductor (CMOS) sensor, may be incorporated to provide imaging functionality (e.g., camera). Accordingly, in one embodiment, the ambient sensor 114 may employ the existing on-board image sensor. Alternatively, photoelectric devices may be employed. Examples of photoelectric devices or sensors may include photo-emissive cells, photo-conductive cells, photo-voltaic cells, photo junction devices. In one embodiment, a Light Dependent Resistor (LDR) cell or a photoelectric cell using Cadmium Sulfide (CdS) or silicon-based phototransistor may be used. An LDR cell may provide a variable resistance as function of illumination. A typical range of the illumination is 10 Lux to 1000 Lux. For a dark or totally black illumination, the range may be less than 15 Lux. A poorly lit room may be less than 25 Lux. The light sensor typically provides a voltage or charge as a function of illumination. The ambient sensor 114 may include a light sensor, a programmable gain amplifier (PGA), an analog-to-digital converter (ADC), and an interface. The ADC converts the voltage or charge to a digital value. By monitoring the digital value representing the ambient illumination, the ambient sensor 114 may provide an indication characterizing the surrounding environment of the device.

The proximity sensor 116 senses the proximity or the presence of a human hand that is normally used to hold the device when the user is making a phone call. The proximity sensing may be based on the electric property of the human body. Typically, the human body radiates a coupled field away from the body due to its conductivity characterized by a grounded capacitance of approximately 120 pF to 150 pF. The human body thus changes the capacitance of an electrode by approach or by touch. Measuring this capacitance therefore may determine the distance between the object (e.g., the human hand) and the electrode. The proximity sensor 116 may include such a proximity sensing element and electronics circuit to provide a digital value representing the degree of presence (or absence) of a human hand within the surrounding area.

The cost calculator 120 may calculate a cost value of the outgoing communication as a function of a plurality of parameters related to at least one of a voice parameter V, an ambient parameter A, a proximity parameter P, a speech pattern parameter S, a call parameter C, and a noise parameter N. These parameters may be normalized to be within some normal range such as from 0 to 1. The cost value may be a composite value or number that quantifies the likelihood, or the probability, that the audio input signal as captured by the input processor 110 is classified as an unintended outgoing communication. The contributions of these parameters may be weighted by corresponding weights that represent the degree of relevance or importance of the parameters. By taking account of one or more of these parameters, the cost value may accurately reflect the source of the audio input signal.

The voice parameter V may be a parameter or a number that quantifies the degree that the audio input signal as provided from the signal processor 112 resembles a human voice. When the mobile device is placed in a pocket, a purse, or a backpack, sounds may be generated as result of movements of the objects within the area (e.g., keys, coins). By measuring the frequency of the input signal, these sounds may be distinguished from a human voice in a normal phone conversation. The ambient parameter A may be a parameter or a value that represents the ambient condition, such as the ambient light level as provided by the ambient sensor 114. The proximity parameter P may be a parameter or a number that characterizes the proximity of a human hand in the surrounding area as provided by the proximity sensor 116. The speech pattern parameter S may be a parameter or a number that quantifies the degree of resemblance of the input signal to a typical human speech pattern as spoken at the beginning of a normal phone conversation. Examples of these speech patterns may be "Hello", "Hi", "Hola", "Hey", "What's up", "Salam", etc. These speech patterns may be pre-stored in a memory or a database accessible by the controller 140. A template matching procedure may be performed to match a segment of the input signal over a time interval with these speech patterns. A matching score may then be provided to rate how close the segment is to any one of the above patterns. The call parameter C may be a parameter or a number that represents the likelihood that the destination number of the outgoing communication is an unintended calling number. Examples of these numbers may be an unrecognized number (e.g., a number that has never been called before, an international country code), a number that has been associated with a speed dial code, and the last dialed number. The mobile device may have a key that, if pressed, automatically places the call to one of frequently called numbers stored in a speed dial database or a redial key to redial the last dialed number. The noise parameter N may be a parameter or a number that represents the likelihood that the audio input signal is a noise signal that is commonly generated when the mobile device is placed in a pocket, a purse, or a backpack. This noise signal may be the rustling sound generated by objects that are moved against one another (e.g., keys jostling against one another). The audio patterns of these sounds may be pre-generated and stored in a memory or database accessible by the controller 140. Similar to the speech pattern parameter case, a template matching procedure may be performed to compare a segment of the input signal with these patterns and a matching score may be generated.

The call suppressor 130 may be coupled to the cost calculator 120 to suppress the outgoing communication when the cost value exceeds a threshold. This threshold may be predetermined to represent the overall likelihood or the probability that the outgoing communication is an unintended outgoing communication. The threshold may also be adaptive in accordance to a learning procedure based on past incidents which represent the particular personal usage of the user.

The controller 140 may be a device or a functionality that performs the overall control of the outgoing communication. It may be the main processor used by the mobile device. It may be an ancillary processor that is designed to specifically perform the outgoing communication control. It may have software and/or hardware interfaces to interface to the cost calculator 120, the call suppressor 130, the display 150, and the keypad 160, and other devices, modules, or functionalities. In one embodiment, it may include storage elements, memory, tables, databases that store predetermined patterns of greetings, speech patterns, or rustling sound patterns to be used by the cost calculator 120 as described above.

The display 150 may be the existing display of the mobile device, or a specially designed display (e.g., a single light-emitting diode). It may display an alarm message, a notification message to alert the user that an unintended outgoing communication is taking place or has taken place. The keypad 160 may be the existing keypad of the mobile device, or a specially input entry keypad (e.g., a switch). It may be used by the user to acknowledge or override the alarm or notification message, to enable or disable the functionality of the outgoing communication control.

Figure 2:
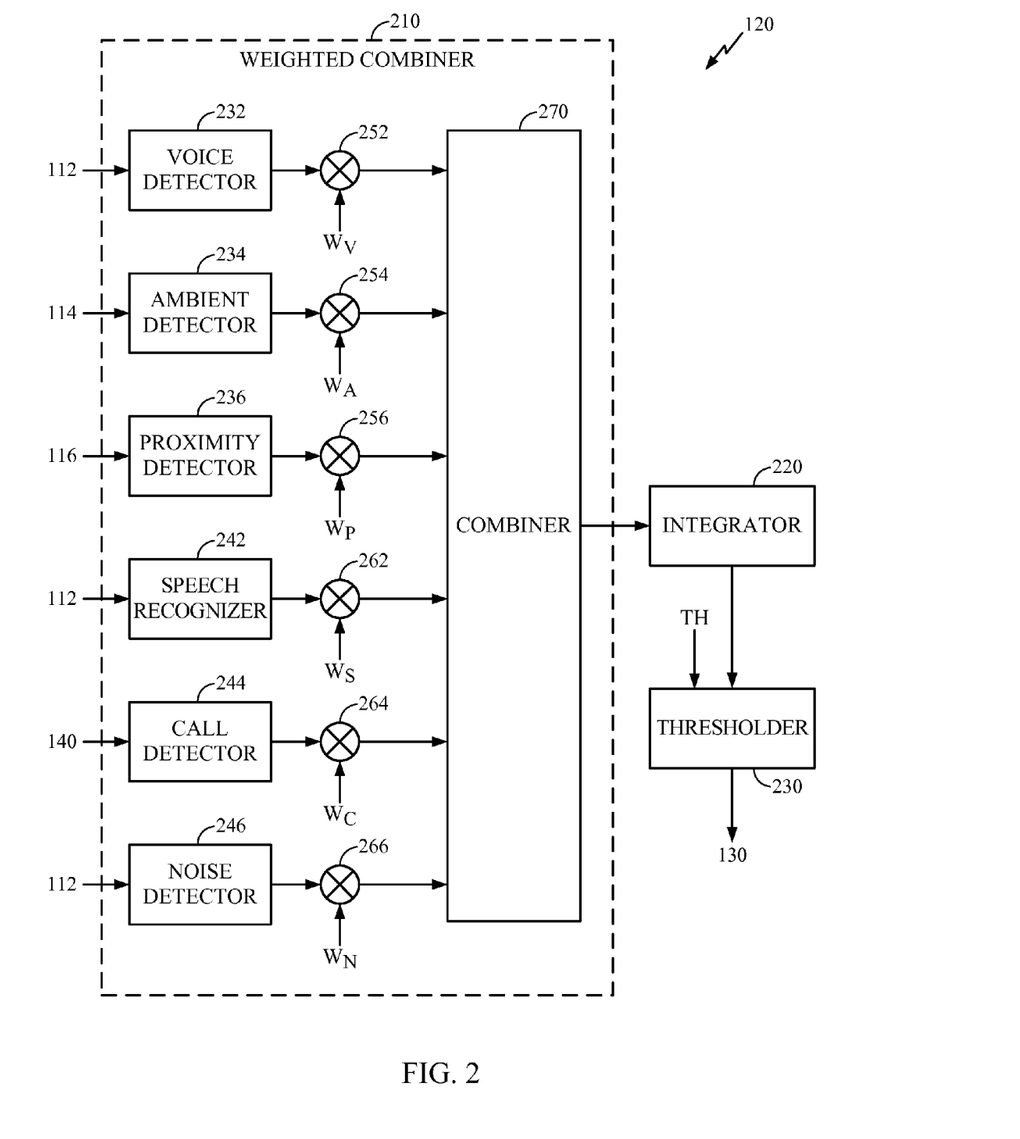
FIG. 2 is a diagram illustrating a cost calculator according to one embodiment.

FIG. 2 is a diagram illustrating the cost calculator 120 shown in FIG. 1 according to one embodiment. The cost calculator 120 includes a weighted combiner 210, an integrator 220, and a thresholder 230.

The weighted combiner 210 may combine the plurality of parameters weighted by at least one of a voice weight $W_V$, an ambient weight $W_A$, a proximity weight $W_P$, a speech pattern weight $W_S$, a call weight $W_C$, and a noise weight $W_N$, corresponding to the at least one of the voice parameter V, the ambient parameter A, the proximity parameter P, the speech pattern parameter S, the call parameter C, and the noise parameter N, respectively. The voice weight $W_V$, the ambient weight $W_A$, the proximity weight $W_P$, the speech pattern weight $W_S$, the call weight $W_C$, and the noise weight $W_N$ may represent the degree of relevance or importance of the parameters. Their values may be real numbers normalized according to a normalization function. For example, the values may be normalized to range from 0 to 1. When the weight value is zero, it indicates that the corresponding parameter is not used to compute the cost value. Therefore, all parameters may be used with the weights to be chosen according to the relevance or importance of the parameters.

The weighted combiner 210 may include a voice detector 232, an ambient detector 234, a proximity detector 236, a speech recognizer 242, a call detector 244, a noise detector 246, a voice multiplier 252, an ambient multiplier 254, a proximity multiplier 256, a speech multiplier 262, a call multiplier 264, a noise multiplier 266, and a combiner 270.

The human voice detector 232 may detect a human voice corresponding to the voice parameter V in the outgoing communication. The ambient detector 234 may detect an ambient light condition corresponding to the ambient parameter. The proximity detector 236 may detect a proximity condition corresponding to the proximity parameter P. The speech recognizer 242 may recognize a greeting pattern corresponding to the speech pattern parameter S. The call detector 244 may detect a code associated with a calling number corresponding to the call parameter C. The noise detector to detect an environmental noise corresponding to the noise parameter.

The voice multiplier 252, the ambient multiplier 254, the proximity multiplier 256, the speech multiplier 262, the call multiplier 264, the noise multiplier 266 may be coupled to the at least one of the human voice detector 232, the ambient detector 234, the proximity detector 236, the speech recognizer 242, the call detector 244, and the noise detector 246, respectively, to multiply the at least corresponding one of the voice parameter V, the ambient parameter A, the proximity parameter P, the speech pattern parameter S, the call parameter C, and the noise parameter N with at least one of the voice weight $W_V$, the ambient weight $W_A$, the proximity weight $W_P$, the speech pattern weight $W_S$, the call weight $W_C$, and the noise weight $W_N$, respectively, to produce at least one of a weighted voice parameter, a weighted ambient parameter, a weighted proximity parameter, a weighted speech pattern parameter, a weighted call parameter, and a weighted noise parameter.

The combiner 270 may be coupled to the at least one of the voice multiplier 252, the ambient multiplier 254, the proximity multiplier 256, the speech multiplier 262, the call multiplier 264, and the noise multiplier 266 to combine the at least one of the weighted voice parameter, the weighted ambient parameter, the weighted proximity parameter, the weighted speech pattern parameter, the weighted call parameter, and the weighted noise parameter. The combiner 270 may be a linear combiner or a non-linear combiner as discussed below. For a linear combiner, the combiner 270 may be an adder. For a non-linear combiner, the combiner 270 may include any suitable arithmetic devices such as a multiplier, a divider, etc.

The integrator 220 may be coupled to the weighted combiner 210 to integrate the weighted plurality of parameters over a time interval T to produce the cost value. The integration time interval may be predetermined and represents the time interval over which the cost value is being computed. The time interval provides a time period to obtain a segment of audio signal for comparison with the pre-stored speech patterns or noise patterns to produce the speech pattern parameter S and the noise parameter N, as discussed above. It may also help increasing the reliability of the calculation of the voice parameter V, the ambient parameter A, the proximity parameter P, and the call parameter C.

The weighted combiner 210 may combine the weighted parameters in a linear or non-linear fashion. For a linear combination, the cost value COST, therefore, may be calculated according to the following equation:

$$\text{COST} = \text{(integrate over } T\text{)}\{V^*W_V + A^*W_A + P^*W_P + S^*W_S + C^*W_C + N^*W_N\} \quad (1)$$

For a non-linear combination, the function employed in the calculation of the cost value may be any suitable non-linear function. The non-linear function may take into account the relationship or correlation of the above parameters. For example, a multiplication or a division function may be used between V and N because these two parameters may be closely related, etc.

The thresholder 230 thresholds the cost value as provided by the integrator 220 to generate a triggering or activation signal to the call suppressor 130. It may be a comparator that compares the cost value with a threshold value TH. The threshold value TH may be predetermined or adaptive according to past incidents.

Figure 3:
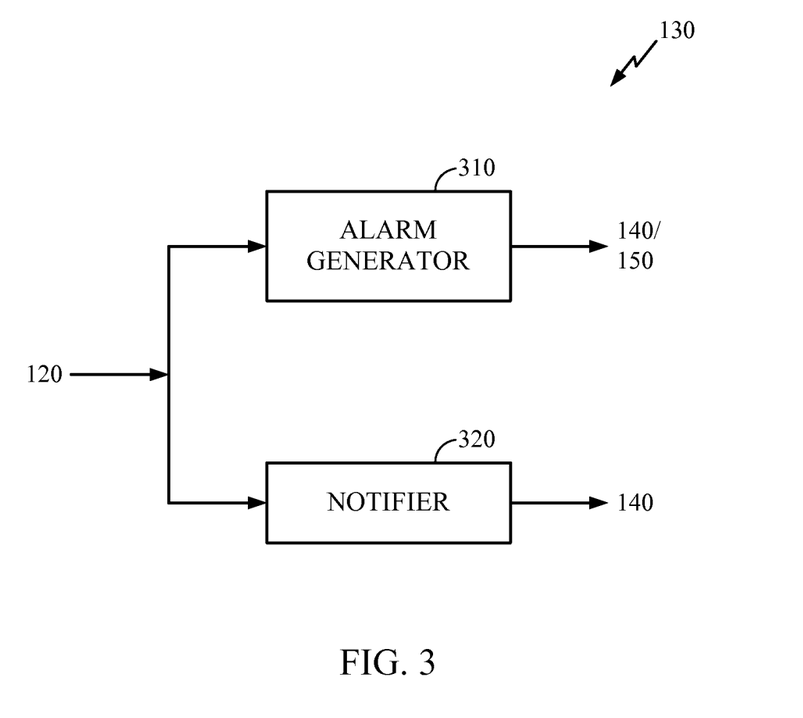
FIG. 3 is a diagram illustrating a call suppressor according to one embodiment.

FIG. 3 is a diagram illustrating the call suppressor 130 shown in FIG. 1 according to one embodiment. The call suppressor 130 may include an alarm generator 310 and a notifier 320. The call suppressor 130 receives the triggering or activation signal from the thresholder 230 of the cost calculator 120.

The alarm generator 310 may generate an alarm signal when the triggering or activation signal is asserted indicating that the outgoing communication is a suspected unintended outgoing communication. The alarm signal may be a distinct audible tone and/or vibration to alert the user of a suspected unintended outgoing communication. Typically, the user may be given a preset amount of time to respond. If this preset time expires without the user's response, the controller 140 may decide to drop or cancel the outgoing communication.

The notifier 320 may generate a notification message to be displayed on the display 150 or store in a message log together with other pertinent information such as the number of the unintended outgoing communication, the time and day of the incident, etc.

Figure 4:
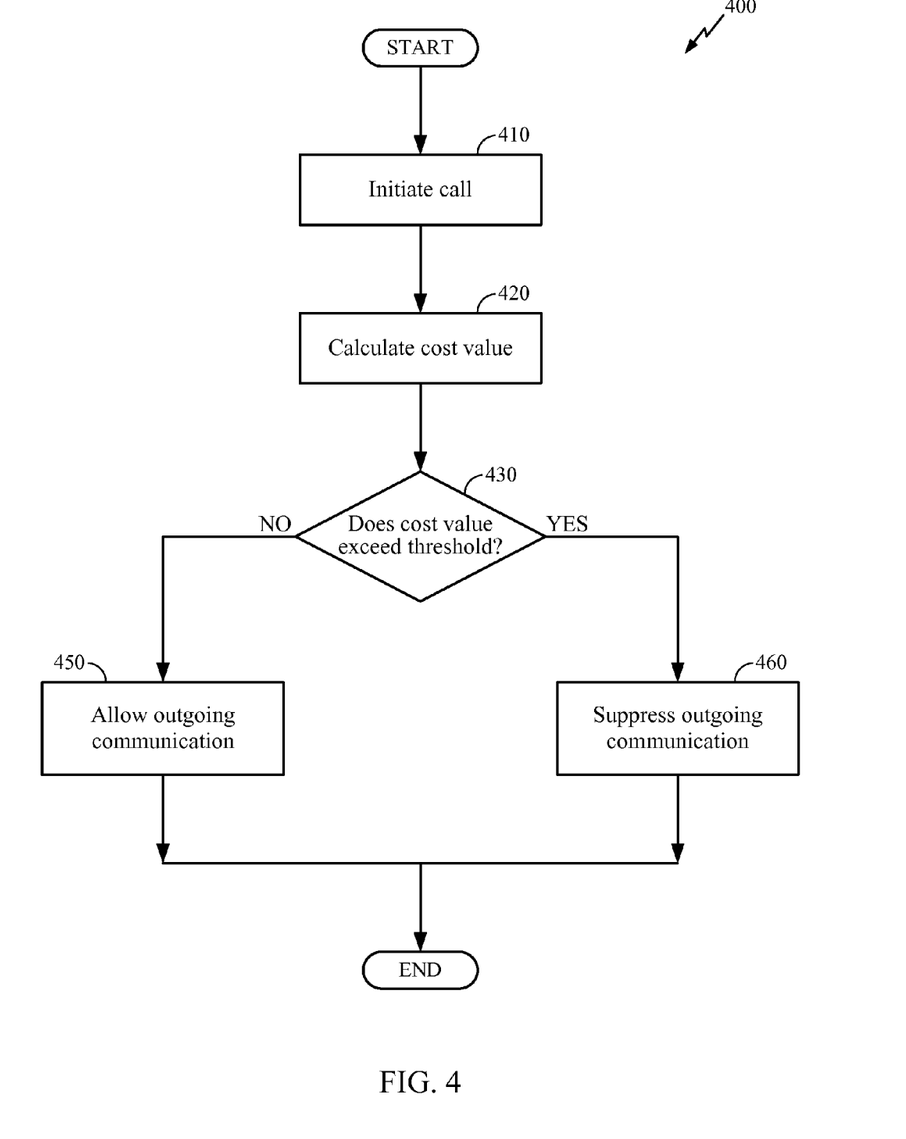
FIG. 4 is a flowchart illustrating a process to inhibit unintended outgoing communication according to one embodiment.

FIG. 4 is a flowchart illustrating a process 400 to inhibit unintended outgoing communication according to one embodiment.

Upon START, the process 400 initiates the call (Block 410). This may be performed by the existing circuitry of the mobile device. The call initiation may be activated by pressing a key on the keypad 160. The activation may be intended or unintended. This call initiation provides an outgoing communication. Next, the process 400 calculates a cost value of the outgoing communication (Block 420). The cost value may be a function of a plurality of parameters related to at least one of a voice parameter, an ambient parameter, a proximity parameter, a speech pattern parameter, a call parameter, and a noise parameter. Then, the process 400 determines if the cost value exceeds a threshold (Block 430). This threshold may be predetermined to represent the overall likelihood or the probability that the outgoing communication is an unintended outgoing communication. The threshold may also be adaptive in accordance to a learning procedure based on past incidents which represent the particular personal usage of the user.

If the cost value does not exceed the threshold (NO branch from Block 430), it is determined that the outgoing communication may be an intended outgoing communication. The process 400 therefore allows the outgoing communication to proceed (Block 450) and is then terminated. If the cost value exceeds the threshold (YES branch from Block 430), it is determined that the outgoing communication may be an unintended outgoing communication. The process 400 therefore suppresses the outgoing communication (Block 460) and is then terminated. In the process of suppressing the outgoing communication (Block 460), the process 400 may generate at least one of an alarm signal and a notification message.

Figure 5:
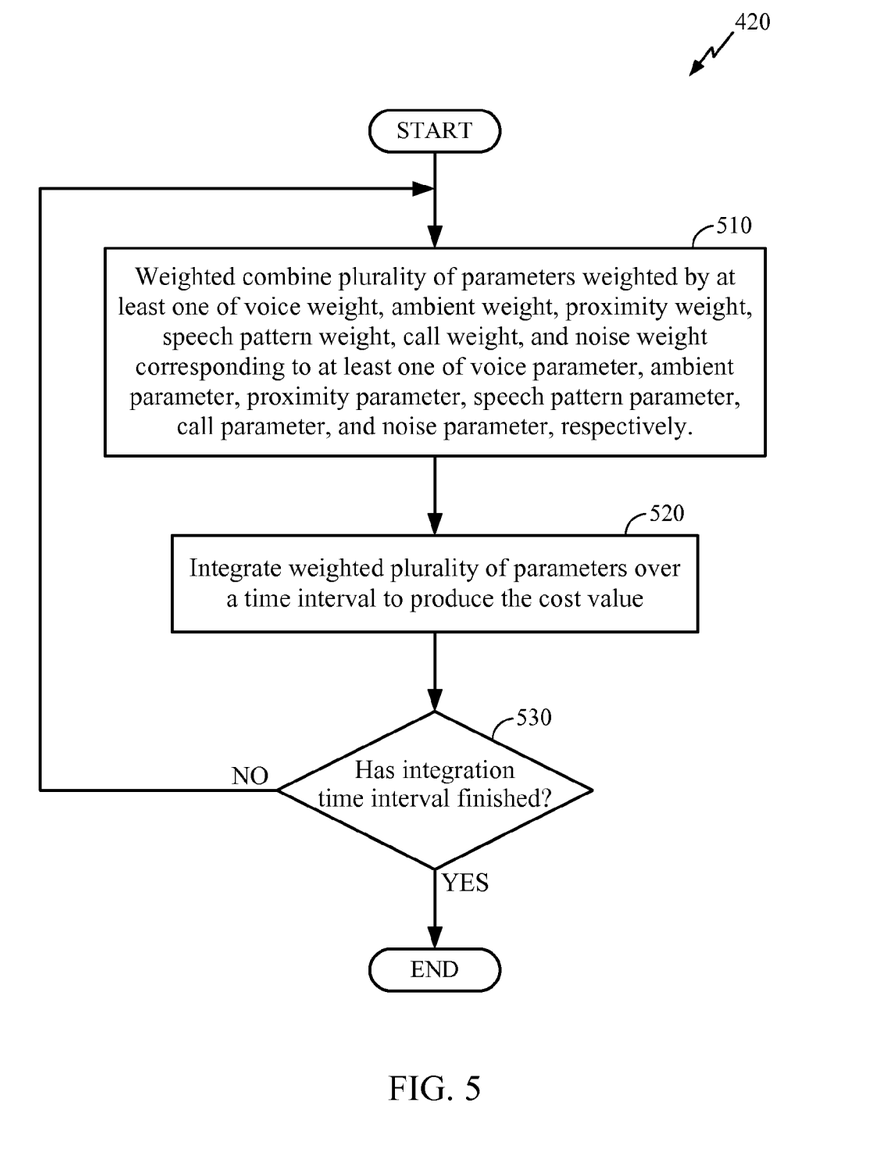
FIG. 5 is a flowchart illustrating a process to calculate a cost value according to one embodiment.

FIG. 5 is a flowchart illustrating the process 420 shown in FIG. 4 to calculate the cost value according to one embodiment.

Upon START, the process 420 weighted combines the plurality of parameters weighted by at least one of a voice weight, an ambient weight, a proximity weight, a speech pattern weight, a call weight, and a noise weight corresponding to at least one of the voice parameter, the ambient parameter, the proximity parameter, the speech pattern parameter, the call parameter, and the noise parameter, respectively (Block 510).

Next, the process 420 integrates the weighted plurality of parameters over a time interval to produce the cost value (Block 520). The integration time interval may be selected such that the cost value may be reliably calculated. In one embodiment, the integration time interval may be a few seconds (e.g., 5 seconds). Then, the process 420 determines if the integration time interval has finished (Block 530). If not, the process 420 returns to Block 510 to continue weighted combining the parameters. Otherwise, the process 420 is terminated.

Figure 6:
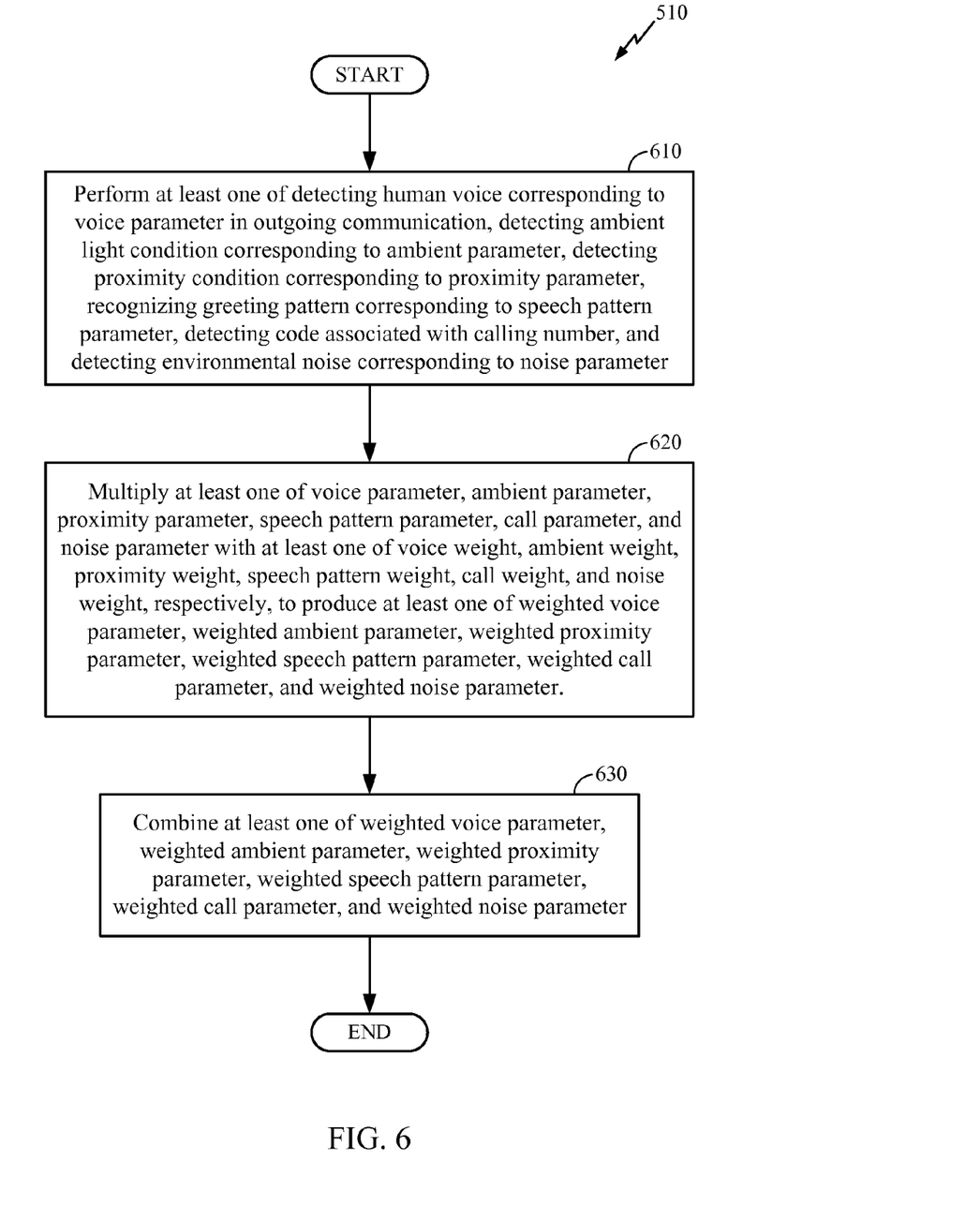
FIG. 6 a flowchart illustrating a process to weighted combine according to one embodiment.

FIG. 6 is a flowchart illustrating the process 510 shown in FIG. 5 to weighted combine according to one embodiment.

Upon START, the process 510 performs at least one of detecting a human voice corresponding to the voice parameter in the outgoing communication, detecting an ambient light condition corresponding to the ambient parameter, detecting a proximity condition corresponding to the proximity parameter, recognizing a greeting pattern corresponding to the speech pattern parameter, detecting a code associated with a calling number, and detecting an environmental noise corresponding to the noise parameter (Block 610). The calling number associated with the code may be one of an unrecognized number, a number associated with a speed dial code, and a last dialed number. The unrecognized number may be a number that does not belong to the numbers that have been called.

Next, the process 510 multiplies the at least one of the voice parameter, the ambient parameter, the proximity parameter, the speech pattern parameter, the call parameter, and the noise parameter with at least one of the voice weight $W_V$, the ambient weight $W_A$, the proximity weight $W_P$, the speech pattern weight $W_S$, the call weight $W_C$, and the noise weight $W_N$, respectively, to produce at least one of a weighted voice parameter, a weighted ambient parameter, a weighted proximity parameter, a weighted speech pattern parameter, a weighted call parameter, and a weighted noise parameter (block 620).

Then, the process 510 combines the at least one of the weighted voice parameter, the weighted ambient parameter, the weighted proximity parameter, the weighted speech pattern parameter, the weighted call parameter, and the weighted noise parameter (Block 630) and is then terminated. The combining operation may be one of a linear combination and a non-linear combination.

Figure 7:
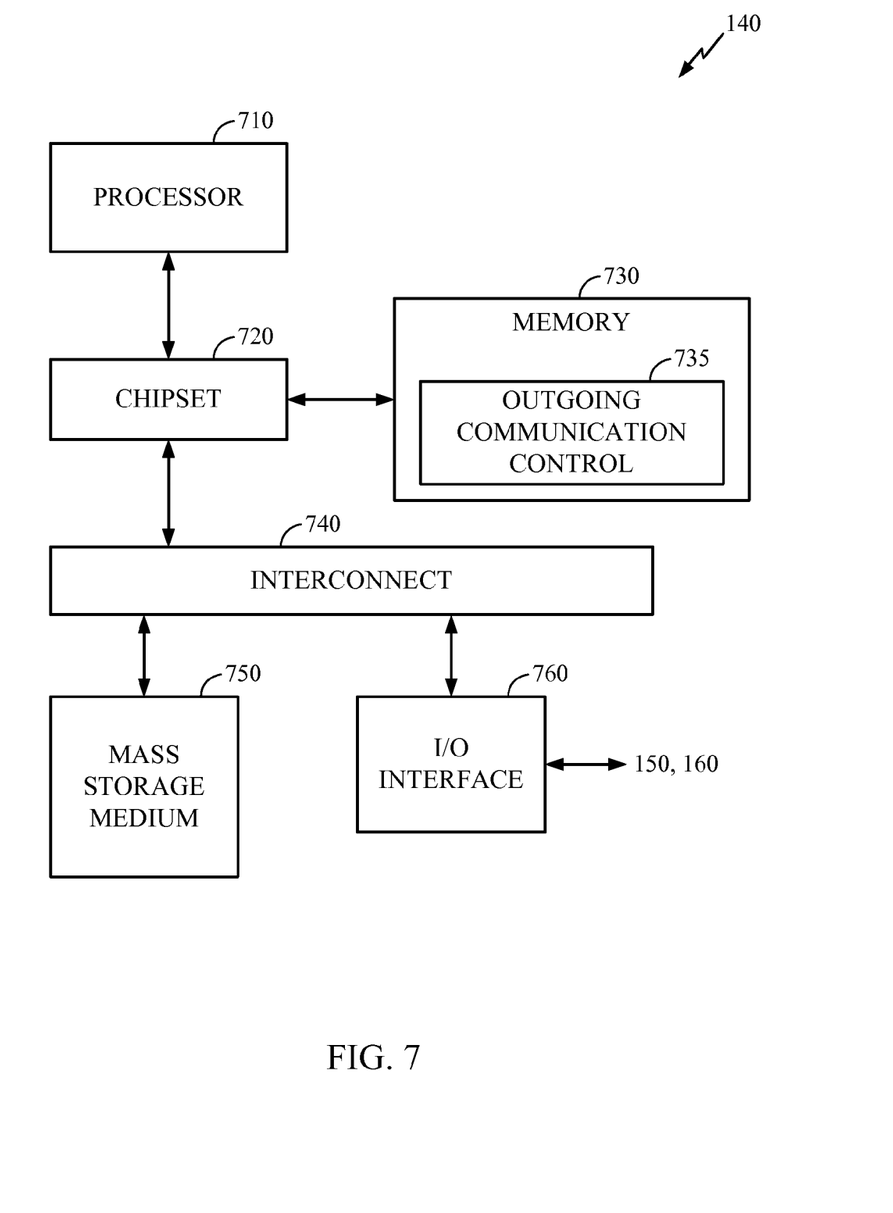
FIG. 7 a flowchart illustrating a process to weighted combine according to one embodiment.

FIG. 7 is a diagram illustrating a system implementing the controller 140 shown in FIG. 1 according to one embodiment. The controller 140 includes a processor 710, a chipset 720, a memory 730, an interconnect 740, a mass storage medium 750, an input/output (I/O) interface 760. The controller 140 may include more or less of the above components.

The processor 710 represents a central processing unit of any type of architecture, such as processors using hyper threading, security, network, digital media technologies, single-core processors, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The chipset 720 provides control and configuration of memory and input/output devices such as the memory 730, the mass storage medium 750 and the I/O interface 760. The chipset 720 may integrate multiple functionalities such as graphics, media, host-to-peripheral bus interface, memory control, power management, etc. It may also include a number of interface and I/O functions such as peripheral component interconnect (PCI) bus interface, processor interface, interrupt controller, direct memory access (DMA) controller, power management logic, timer, system management bus (SMBus), universal serial bus (USB) interface, mass storage interface, low pin count (LPC) interface, wireless interconnect, direct media interface (DMI), etc.

The memory 730 stores code and data. The memory 730 is typically implemented with dynamic random access memory (DRAM), static random access memory (SRAM), or any other types of memories including those that do not need to be refreshed. The memory 730 may include an outgoing communication control module 735 that performs all or portion of the operations described above.

The interconnect 740 provides interface to peripheral devices. The interconnect 740 may be point-to-point or connected to multiple devices. For clarity, not all interconnects are shown. It is contemplated that the interconnect 740 may include any interconnect or bus such as Peripheral Component Interconnect (PCI), PCI Express, Universal Serial Bus (USB), Small Computer System Interface (SCSI), serial SCSI, and Direct Media Interface (DMI), etc.

The mass storage medium 750 includes interfaces to mass storage devices to store archive information such as code, programs, files, data, and applications. The mass storage interface may include SCSI, serial SCSI, Advanced Technology Attachment (ATA) (parallel and/or serial), Integrated Drive Electronics (IDE), enhanced IDE, ATA Packet Interface (ATAPI), etc. The mass storage device may include compact disk (CD) read-only memory (ROM), digital video/versatile disc (DVD), floppy drive, hard drive, tape drive, and any other magnetic or optic storage devices. The mass storage device provides a mechanism to read machine-accessible media. In one embodiment, the mass storage medium 750 may include flash memory.

The I/O interface 760 provides interface to I/O devices such as the display 150 and the keypad 160. The I/O interface 760 may provide interface to a touch screen in the graphics display 150, the keypad 160, and other communication or imaging devices such as camera, Bluetooth interface, etc.

Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EPROM). Examples of firmware may include microcode, writable control store, microprogrammed structure. When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine-accessible medium. The "processor-readable or accessible medium" or "machine-readable or accessible medium" may include any medium that may store or transfer information. Examples of the processor-readable or machine-accessible storage medium include an electronic circuit, a semiconductor memory device, a read-only memory (ROM), a flash memory, an erasable programmable ROM (EPROM), a floppy diskette, a compact disk (CD) ROM, an optical disk, a hard disk, etc. The machine accessible storage medium may be embodied in an article of manufacture. The machine-accessible storage medium may include information or data that, when accessed by a machine, cause the machine to perform the operations or actions described above. The machine-accessible storage medium may also include program code, instruction or instructions embedded therein. The program code may include machine-readable code, instruction or instructions to perform the operations or actions described above. The term "information" or "data"

here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. An apparatus comprising:
    a cost calculator to calculate a cost value of an outgoing communication as a function of a plurality of parameters related to at least one of a voice parameter, an ambient parameter, a proximity parameter, a speech pattern parameter, a call parameter, and a noise parameter, wherein the cost calculator comprises a weighted combiner to combine the plurality of parameters weighted by at least one of a voice weight, an ambient weight, a proximity weight, a speech pattern weight, a call weight, and a noise weight corresponding to the at least one of the voice parameter, the ambient parameter, the proximity parameter, the speech pattern parameter, the call parameter, and the noise parameter, respectively; and
    a call suppressor coupled to the cost calculator to suppress the outgoing communication when the cost value exceeds a predetermined threshold.

2. The apparatus of claim 1 wherein the cost calculator further comprises:
    an integrator coupled to the weighted combiner to integrate the weighted plurality of parameters over a time interval to produce the cost value.

3. The apparatus of claim 1 wherein the weighted combiner comprises at least one of a human voice detector to detect a human voice corresponding to the voice parameter in the outgoing communication, an ambient detector to detect an ambient light condition corresponding to the ambient parameter, a proximity detector to detect a proximity condition corresponding to the proximity parameter, a speech recognizer to recognize a greeting pattern corresponding to the speech pattern parameter, a call detector to detect a code associated with a calling number corresponding to the call parameter, and a noise detector to detect an environmental noise corresponding to the noise parameter.

4. The apparatus of claim 3 wherein the weighted combiner further comprises:
    at least one of a voice multiplier, an ambient multiplier, a proximity multiplier, a speech multiplier, a call multiplier, and a noise multiplier coupled to the at least one of the human voice detector, the ambient detector, the proximity detector, the speech recognizer, the call detector, and the noise detector, respectively, to multiply the at least corresponding one of the voice parameter, the ambient parameter, the proximity parameter, the speech pattern parameter, the call parameter, and the noise parameter with at least one of the voice weight, the ambient weight, the proximity weight, the speech pattern weight, the call weight, and the noise weight, respectively, to produce at least one of a weighted voice parameter, a weighted ambient parameter, a weighted proximity parameter, a weighted speech pattern parameter, a weighted call parameter, and a weighted noise parameter; and
    a combiner coupled to the at least one of the voice multiplier, the ambient multiplier, the proximity multiplier, the speech multiplier, the call multiplier, and the noise multiplier to combine the at least one of the weighted voice parameter, the weighted ambient parameter, the weighted proximity parameter, the weighted speech pattern parameter, the weighted call parameter, and the weighted noise parameter.

5. The apparatus of claim 4 wherein the combiner is one of a linear combiner and a non-linear combiner.

6. The apparatus of claim 3 wherein the calling number is one of an unrecognized number, a number associated with a speed dial code, and a last dialed number.

7. The apparatus of claim 1 wherein the call suppressor comprises at least one of an alarm generator to generate an alarm signal and a notifier to generate a notification message.

8. A method comprising:
    calculating a cost value of an outgoing communication in a mobile device as a function of a plurality of parameters related to at least one of a voice parameter, an ambient parameter, a proximity parameter, a speech pattern parameter, a call parameter, and a noise parameter, wherein calculating comprises weighted combining the plurality of parameters weighted by at least one of a voice weight, an ambient weight, a proximity weight, a speech pattern weight, a call weight, and a noise weight corresponding to the at least one of the voice parameter, the ambient parameter, the proximity parameter, the speech pattern parameter, the call parameter, and the noise parameter, respectively; and
    suppressing the outgoing communication when the cost value exceeds a predetermined threshold.

9. The method of claim 8 wherein calculating further comprises
integrating the weighted plurality of parameters over a time interval to produce the cost value.

10. The method of claim 8 wherein weighted combining comprises performing at least one of detecting a human voice corresponding to the voice parameter in the outgoing communication, detecting an ambient light condition corresponding to the ambient parameter, detecting a proximity condition corresponding to the proximity parameter, recognizing a greeting pattern corresponding to the speech pattern parameter, detecting a code associated with a calling number corresponding to the call parameter, and detecting an environmental noise corresponding to the noise parameter.

11. The method of claim 10 wherein weighted combining further comprises:
multiplying the at least one of the voice parameter, the ambient parameter, the proximity parameter, the speech pattern parameter, the call parameter, and the noise parameter with at least one of the voice weight, the ambient weight, the proximity weight, the speech pattern weight, the call weight, and the noise weight, respectively, to produce at least one of a weighted voice parameter, a weighted ambient parameter, a weighted proximity parameter, a weighted speech pattern parameter, a weighted call parameter, and a weighted noise parameter; and
combining the at least one of the weighted voice parameter, the weighted ambient parameter, the weighted proximity parameter, the weighted speech pattern parameter, the weighted call parameter, and the weighted noise parameter.

12. The method of claim 11 wherein combining uses one of a linear combination and a non-linear combination.

13. The method of claim 10 wherein the calling number is one of an unrecognized number, a number associated with a speed dial code, and a last dialed number.

14. The method of claim 8 wherein suppressing comprises at least one of generating an alarm signal and generating a notification message.

15. An article of manufacture comprising a machine-accessible storage medium including data that, when accessed by a machine, cause the machine to perform operations comprising:
calculating a cost value of an outgoing communication in a mobile device as a function of a plurality of parameters related to at least one of a voice parameter, an ambient parameter, a proximity parameter, a speech pattern parameter, a call parameter, and a noise parameter, wherein calculating comprises weighted combining the plurality of parameters weighted by at least one of a voice weight, an ambient weight, a proximity weight, a speech pattern weight, call weight, and a noise weight corresponding to the at least one of the voice parameter, the ambient parameter, the proximity parameter the speech pattern parameter, the call parameter, and the noise parameter, respectively; and
suppressing the outgoing communication when the cost value exceeds a predetermined threshold.

16. The article of manufacture of claim 15 wherein calculating further comprises
integrating the weighted plurality of parameters over a time interval to produce the cost value.

17. The article of manufacture of claim 15 wherein weighted combining comprises at least performing one of detecting a human voice corresponding to the voice parameter in the outgoing communication, detecting an ambient light condition corresponding to the ambient parameter, detecting a proximity condition corresponding to the proximity parameter, recognizing a greeting pattern corresponding to the speech pattern parameter, detecting a code associated with a calling number corresponding to the call parameter, and detecting an environmental noise corresponding to the noise parameter.

18. The article of manufacture of claim 17 wherein weighted combining further comprises:
multiplying the at least one of the voice parameter, the ambient parameter, the proximity parameter, the speech pattern parameter, the call parameter, and the noise parameter with at least one of the voice weight, the ambient weight, the proximity weight, the speech pattern weight, the call weight, and the noise weight, respectively, to produce at least one of a weighted voice parameter, a weighted ambient parameter, a weighted proximity parameter, a weighted speech pattern parameter, a weighted call parameter, and a weighted noise parameter; and
combining the at least one of the weighted voice parameter, the weighted ambient parameter, the weighted proximity parameter, the weighted speech pattern parameter, the weighted call parameter, and the weighted noise parameter.

19. The article of manufacture of claim 18 wherein combining uses one of a linear combination and a non-linear combination.

20. The article of manufacture of claim 17 wherein the calling number is one of an unrecognized number, a number associated with a speed dial code, and a last dialed number.

21. The article of manufacture of claim 15 wherein suppressing comprises at least one of generating an alarm signal and generating a notification message.

22. An apparatus comprising:
means for calculating a cost value of an outgoing communication as a function of a plurality of parameters related to at least one of a voice parameter, an ambient parameter, a proximity parameter, a speech pattern parameter, a call parameter, and a noise parameter, wherein the means for calculating comprises means for weighted combining the plurality of parameters weighted by at least one of a voice weight, an ambient weight, a proximity weight, a speech pattern weight, and a noise weight corresponding to the at least one of the voice parameter, the ambient parameter, the proximity parameter, the speech pattern parameter, the call parameter, and the noise parameter, respectively; and
means for suppressing the outgoing communication when the cost value exceeds a predetermined threshold.

23. The apparatus of claim 22, wherein the means for calculating further comprises:
means for integrating the weighted plurality of parameters over a time interval to produce the cost value.

24. The apparatus of claim 23 wherein the means for weighted combining comprises at least means for performing one of means for detecting a human voice corresponding to the voice parameter in the outgoing communication, means for detecting an ambient light condition corresponding to the ambient parameter, means for detecting a proximity condition corresponding to the proximity parameter, means for recognizing a greeting pattern corresponding to the speech pattern parameter, means for detecting a code associated with a calling number corresponding to the call parameter, and means for detecting an environmental noise corresponding to the noise parameter.

25. The apparatus of claim 24 wherein the means for weighted combining further comprises:
- means for multiplying the at least one of the voice parameter, the ambient parameter, the proximity parameter, the speech pattern parameter, the call parameter, and the noise parameter with at least one of the voice weight, the ambient weight, the proximity weight, the speech pattern weight, the call weight, and the noise weight, respectively, to produce at least one of a weighted voice parameter, a weighted ambient parameter, a weighted proximity parameter, a weighted speech pattern parameter, a weighted call parameter, and a weighted noise parameter; and
- means for combining the at least one of the weighted voice parameter, the weighted ambient parameter, the weighted proximity parameter, the weighted speech pattern parameter, the weighted call parameter, and the weighted noise parameter.

26. The apparatus of claim 25 wherein the means for combining uses one of a linear combination and a non-linear combination.

27. The apparatus of claim 24 wherein the calling number is one of an unrecognized number, a number associated with a speed dial code, and a last dialed number.

28. The apparatus of claim 22 wherein the means for suppressing comprises at least one of means for generating an alarm signal and means for generating a notification message.

* * * * *